United States Patent
Ramamoorthy et al.

(10) Patent No.: US 12,382,254 B2
(45) Date of Patent: Aug. 5, 2025

(54) METHOD AND APPARATUS FOR SHARING REASON CAUSE FOR MCX COMMUNICATION OVER PRE-ESTABLISHED SESSION

(71) Applicant: Samsung Electronics Co., Ltd., Suwon-si (KR)

(72) Inventors: Vengataraaman Ramamoorthy, Bangalore (IN); Kiran Gurudev Kapale, Bangalore (IN); Siva Prasad Gundur, Bangalore (IN); Vijay Sangameshwara, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 389 days.

(21) Appl. No.: 17/883,060

(22) Filed: Aug. 8, 2022

(65) Prior Publication Data
US 2022/0408230 A1    Dec. 22, 2022

Related U.S. Application Data (63) Continuation of application No. PCT/KR2021/006370, filed on May 21, 2021.

(30) Foreign Application Priority Data

May 22, 2020 (IN) ............................. 202041021661
Apr. 28, 2021 (IN) ........................... 2020 41021661

(51) Int. Cl.
*H04W 4/10* (2009.01)
*H04L 67/14* (2022.01)
(Continued)

(52) U.S. Cl.
CPC ............. *H04W 4/10* (2013.01); *H04L 67/14* (2013.01); *H04W 4/90* (2018.02); *H04W 76/45* (2018.02); *H04W 76/50* (2018.02)

(58) Field of Classification Search
CPC ............ H04W 4/10–203; H04W 4/90; H04W 76/40–50
See application file for complete search history.

(56) References Cited

U.S. PATENT DOCUMENTS

2010/0103927 A1   4/2010   Bakker
2010/0260107 A1   10/2010   Shuman et al.
(Continued)

FOREIGN PATENT DOCUMENTS

CN      106537888 A    3/2017
CN      107667553 A    2/2018
(Continued)

OTHER PUBLICATIONS

Samsung, Authorisation validation for first-to answer call origination requesting user using pre-established session, C1-202834, 3GPP TSG-CT WG1 Meeting #123-e, XP052321864, Apr. 22, 2020, Electronic meeting.
(Continued)

*Primary Examiner* — San Htun
(74) *Attorney, Agent, or Firm* — Jefferson IP Law, LLP (57) ABSTRACT

A method for sharing a reason cause for a mission critical communication (MCX) communication over pre-established session in an MCC network is provided. The method includes transmitting, to the server, a call initiation request to initiate a call, wherein the call initiation request includes first information on a session type and second information on a resource list, receiving, from the server, a mission critical pre-established session control (MCPC) connect message including a security message, determining whether an authentication for the security message is successful, and transmitting, to the server, a first MCPC acknowledgement message including a reason cause field to inform a reason for
(Continued)

terminating the call in response to determining that the authentication for the security message is not successful.

13 Claims, 7 Drawing Sheets

(51) Int. Cl.
*H04W 4/90* (2018.01)
*H04W 76/45* (2018.01)
*H04W 76/50* (2018.01)

(56) References Cited

U.S. PATENT DOCUMENTS

| | | |
|---|---|---|
| 2015/0341500 A1 | 11/2015 | Rios et al. |
| 2016/0353276 A1 | 12/2016 | Wendling |
| 2016/0381528 A1* | 12/2016 | Lee .................. H04W 4/10 455/404.1 |
| 2017/0245123 A1 | 8/2017 | Baek et al. |
| 2017/0257751 A1* | 9/2017 | Atarius .............. H04W 8/005 |
| 2017/0289776 A1* | 10/2017 | Kim .................. H04W 4/10 |
| 2017/0303100 A1 | 10/2017 | Dong et al. |
| 2017/0310761 A1 | 10/2017 | Enomoto et al. |
| 2018/0131730 A1 | 5/2018 | Leis et al. |
| 2019/0335328 A1* | 10/2019 | Ben Henda ........... H04W 12/04 |
| 2020/0137531 A1* | 4/2020 | Gupta .................. H04W 76/38 |
| 2021/0144536 A1* | 5/2021 | Wänstedt ............. H04W 76/50 |
| 2022/0039199 A1* | 2/2022 | Leis .................. H04W 8/26 |

FOREIGN PATENT DOCUMENTS

| | | |
|---|---|---|
| CN | 109698848 A | 4/2019 |
| CN | 110621084 A | 12/2019 |
| WO | 2016/106600 A1 | 7/2016 |
| WO | 2017/057962 A1 | 4/2017 |
| WO | WO-2018012934 A1 * | 1/2018 ......... H04L 65/1069 |

OTHER PUBLICATIONS

Samsung, Authentication of the Mikey-Sakke I_Message validation in pre-established session, C1-203651, 3GPP TSG-CT WG1 Meeting #124-e, XP052322594, May 26, 2020, Electronic meeting.
European Search Report dated Aug. 7, 2023, issued in European Application No. 21809630.3.
Indian Examination Report dated Feb. 17, 2022, issued in Indian Application No. 202041021661.
3rd Generation Partnership Project; Technical Specification Group Core Network and Terminals; Mission Critical Push to Talk (MCPTT) call control; Protocol specification (Release 16), 3GPP 24.379 V16.2.0, Sep. 24, 2019.
Samsung, Authentication of the Mikey-Sakke I_Message validation in pre-established session, C1-202559, 3GPP TSG-CT WG1 Meeting #123-e, Apr. 9, 2020, Electronic meeting.
Ericsson, Corrections related to MCPC, C1-194474, 3GPP TSG-CT WG1 Meeting #119, Aug. 18, 2019, Wroclaw (Poland).
Chinese Examination Report dated Nov. 7, 2024, issued in Chinese Application No. 202180032284.0.
Chinese Office Action dated Mar. 20, 2025, issued in Chinese Application No. 202180032284.0.
3GPP, Mission Critical Push To Talk (MCPTT) media plane control, Protocol specification (3GPP TS 24.380 version 18.6.0 Release 18), EETSI TS 124 380 V18.6.0, Jul. 2024.

* cited by examiner

METHOD AND APPARATUS FOR SHARING REASON CAUSE FOR MCX COMMUNICATION OVER PRE-ESTABLISHED SESSION

CROSS-REFERENCE TO RELATED APPLICATION(S)

This application is a continuation application, claiming priority under § 365(c), of an International application No. PCT/KR2021/006370, filed on May 21, 2021, which was based on and claimed the benefit of an Indian Provisional patent application number 202041021661, filed on May 22, 2020, and of an Indian patent application number 202041021661, filed on Apr. 28, 2021, in the Indian Intellectual Property Office, the disclosure of each of which is incorporated by reference herein in its entirety.

BACKGROUND

1. Field

The disclosure relates to wireless communication. More particularly, the disclosure relates to a method and apparatus for sharing reason cause for a Mission Critical Communications (MCX) communication over a pre-established session in an MCX network.

2. Description of Related Art

In general, any failure in a Session Initiation Protocol (SIP) is reported using a response code and a reason code header in wireless communication. Based on the response code and the reason code header, an originator (i.e. user/user of a User Equipment (UE)/UE) of a SIP request will take necessary actions to recover from the any failure or warn the UE about a type of failure. So, the originator must be aware of a reason cause for the failure. Furthermore, in existing Third Generation Partnership Project (3GPP) TS 24.379 and 3GPP TS 24.380, there is no mechanism for transmitting any failure (e.g. failure to authenticate, denial of a call request or termination of a call, or removal of the user from a continuous call or any other error) reason cause to the UE during a pre-established session. As a result, without knowing the precise reason cause for the failure, the UE is unable to take necessary action(s) to recover from the failure.

For example, consider a scenario in which a first UE (i.e. UE1) (10a) wants to establish a first-to-answer call with one/multiple second UEs (i.e. UE2, UE3, UE4, etc.) (10b) in an MCX network, as illustrates in FIG. 1A. At S101a-102a, a session is established between a server (20) and the UEs (10a, 10b) to any communication and the session can later be used for any MCX calls (e.g. a private call, a group call, an ambient call, and the first-to-answer call, etc.). The session may be called "pre-established session"

Figure 1A:
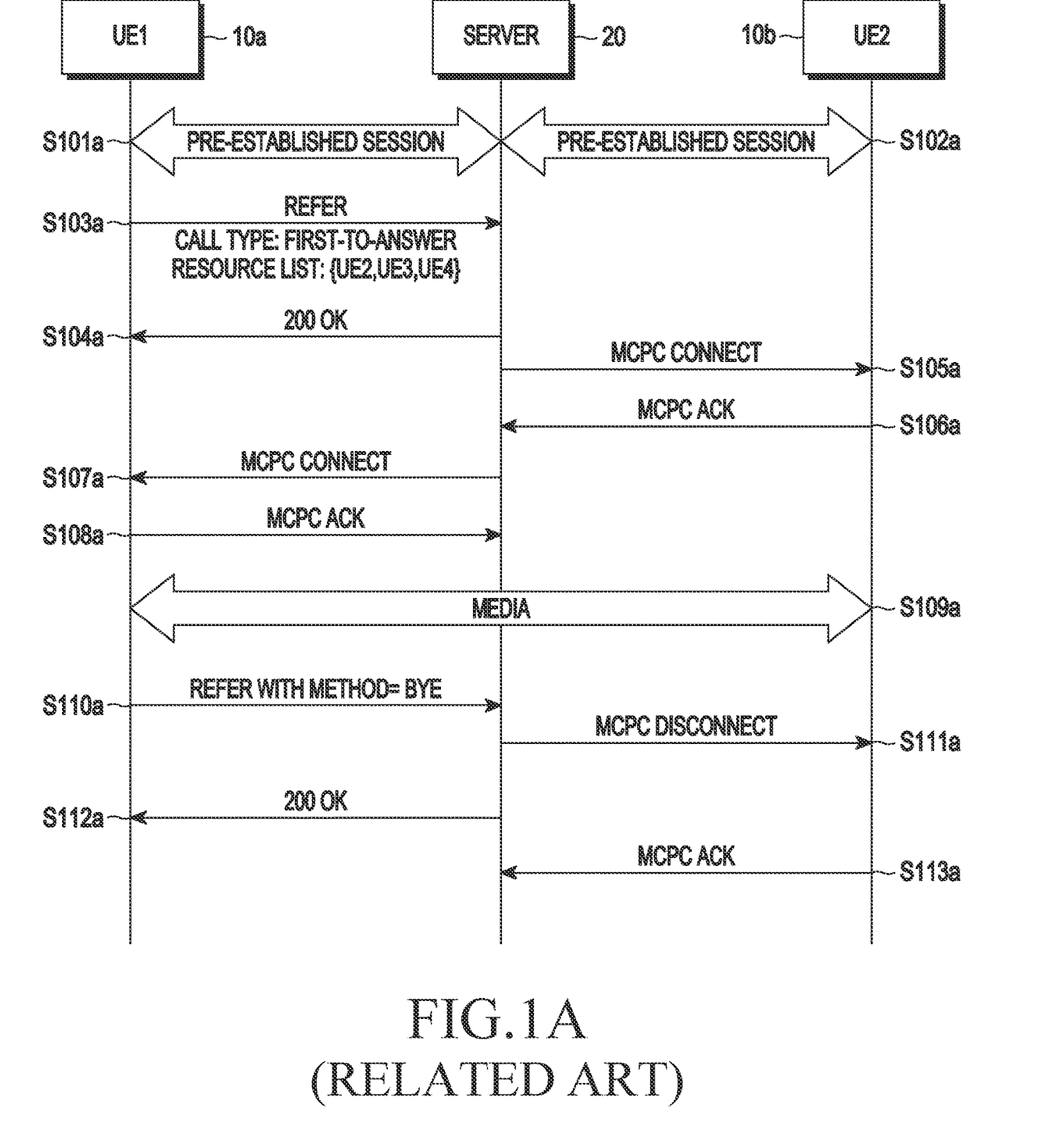
FIG. 1A is a sequence diagram illustrating a problem scenario in a first-to-answer call where a first User Equipment (UE) terminates an established call with a second UE without providing a precise reason cause for the established call termination over a session that is pre-established ("pre-established session") in a Mission Critical Communication (MCX) network, according to the related art.

FIG. 1A is a sequence diagram illustrating a problem scenario in a first-to-answer call where a first User Equipment (UE) terminates an established call with a second UE without providing a precise reason for the established call termination over a pre-established session in a Mission Critical Communication (MCX) network, according to the related art.

Referring to FIG. 1A, at S103a, the UE1 (10a) sends a call initiation request to the server 20, the call initiation request includes multiple potential target recipients (i.e. UE2 10b) or a list of other users with an intention to establish a call and as soon as one of the potential target recipients accepts the call, rest of the call will be terminated. The call initiation request may be SIP (session initiation protocol) REFER request. At S104a, the server 20 sends an acknowledgement message to the UE1 10a in response to receiving the call initiation request. At S105a-S106a, the server 20 sends a Mission Critical Pre-established Session Control (MCPC) connect message to the UE2 10b and receives an MCPC acknowledgement message from the UE2 10b for successful reception of the MCPC connect. In the first-to-answer call, only the UE2 10b generates and sends security parameter (e.g. I_MESSAGE for sharing Secure Real Time Protocol (SRTP) keys) to the UE1 10a as the UE1 10a does not know which potential target recipients accept the call first.

At S107a-S108a, the server 20 sends the MCPC connect message to the UE1 10a for successful reception of the MCPC acknowledgement message and receives the MCPC acknowledgement message from the UE1 10a for the successful reception of the MCPC connect message. At S109a, media communication will be established between the UE1 10a and the UE2 10b. At S110a-S113a, the UE1 10a sends a BYE message to the server 20 to terminate/disconnect for the ongoing media communication with the UE2 10b, without providing the reason cause for a failure. In that scenario, the UE2 10b and/or server 20 are unable to take necessary action to recover the ongoing media communication from the failure.

Figure 1B:
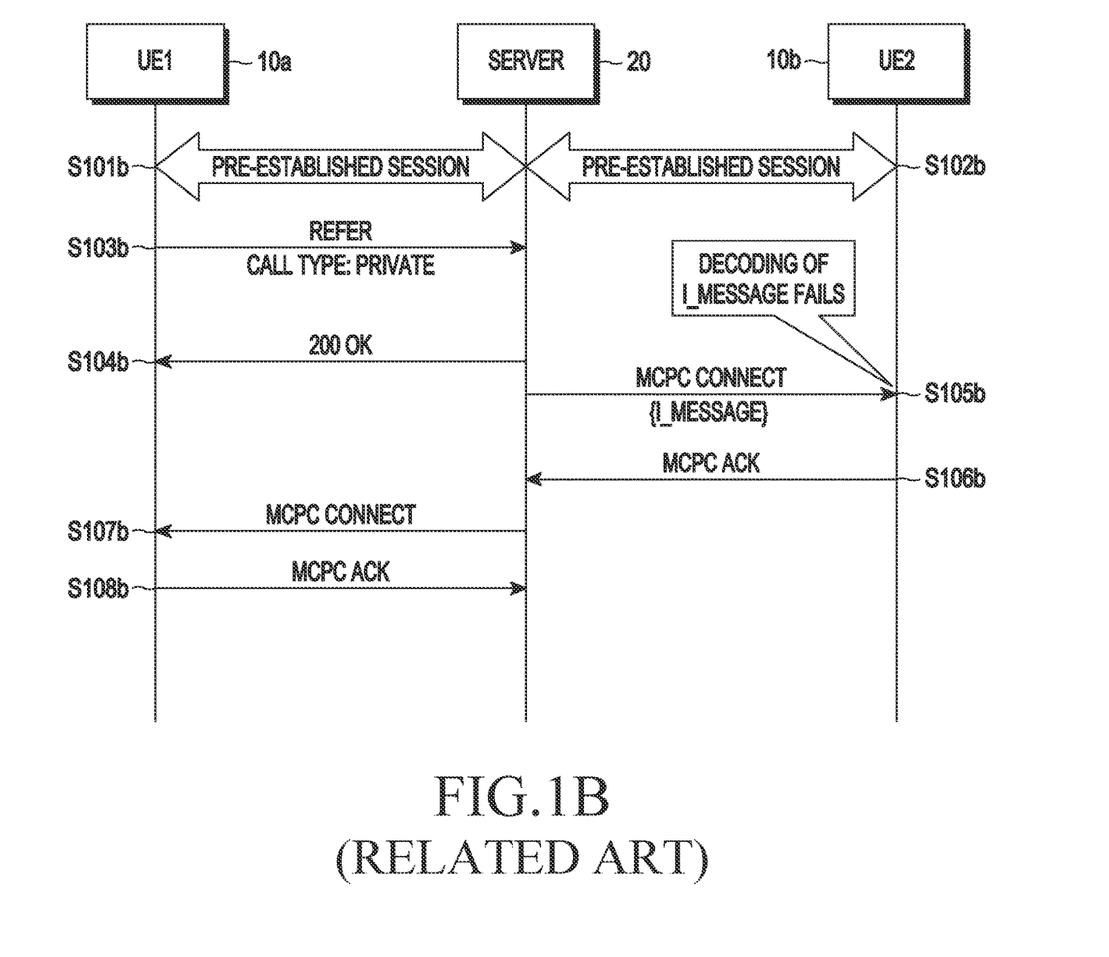
FIG. 1B is a sequence diagram illustrating a problem scenario in a private call where the second UE is unable to inform the first UE regarding the reason cause for decoding failure of an authentication message using an MCPC acknowledgement message over the pre-established session in the MCX network, according to the related art.

In another example, consider a scenario in which the UE1 10a wants to establish the private call with the UE2 10b in the MCX network, as illustrates in FIG. 1B.

FIG. 1B is a sequence diagram illustrating a problem scenario in a private call where the second UE is unable to inform the first UE regarding the precise reason for decoding failure of an authentication message using an MCPC acknowledgement message over the pre-established session in the MCX network, according to the related art.

Referring to FIG. 1B, at S101b-102b, the session is established between the server 20 and the UEs 10a and 10b to any communication and the session can later be used for any MCX calls. The session may be called "pre-established session". At S103b, the UE1 10a sends the call initiation request to the server 20, the call initiation request includes the I_MESSAGE. The call initiation request may be SIP REFER request. At S104b, the server 20 sends the acknowledgement message to the UE1 (10a) in response to receiving the call initiation request.

At S105b-S108b, the server 20 sends the MCPC connect message to the UE2 10b, but there is an authentication failure or decoding failure of the I_MESSAGE at the UE2 10b. In the existing method, there is no mechanism to convey the precise reason cause for the failure to the UE1 10a during the pre-established session. The only way to communicate/inform the failure of a call establishment is through the MCPC acknowledgement message, a Type-Length-Value or Tag-Length-Value (TLV) format of the existing MCPC acknowledgement message is shown in Table. 1.

TABLE 1

| 0 | 1 | 2 | 3 |
|---|---|---|---|
| 0 1 2 3 4 5 6 7 8 9 | 0 1 2 3 4 5 6 7 8 9 | 0 1 2 3 4 5 6 7 8 9 | 0 1 |

| |V=2|P| Subtype | PT=APP=204 | Length | |
|---|
| SSRC of floor participant |
| name = MCPC |
| Reason Code field |

But existing reason code field of the existing MCPC acknowledgement message have only three reason code values (i.e. accepted, busy, and not accepted) and there is no mapping between the reason code value and the reason cause for the failure available in the existing mechanism. Further, the existing MCPC acknowledgement message does not indicate the reason cause for the failure. In that scenario, the UE2 10b and/or server 20 and/or the UE1 10a are unable to take necessary action to recover the ongoing media communication from the failure.

Figure 1C:
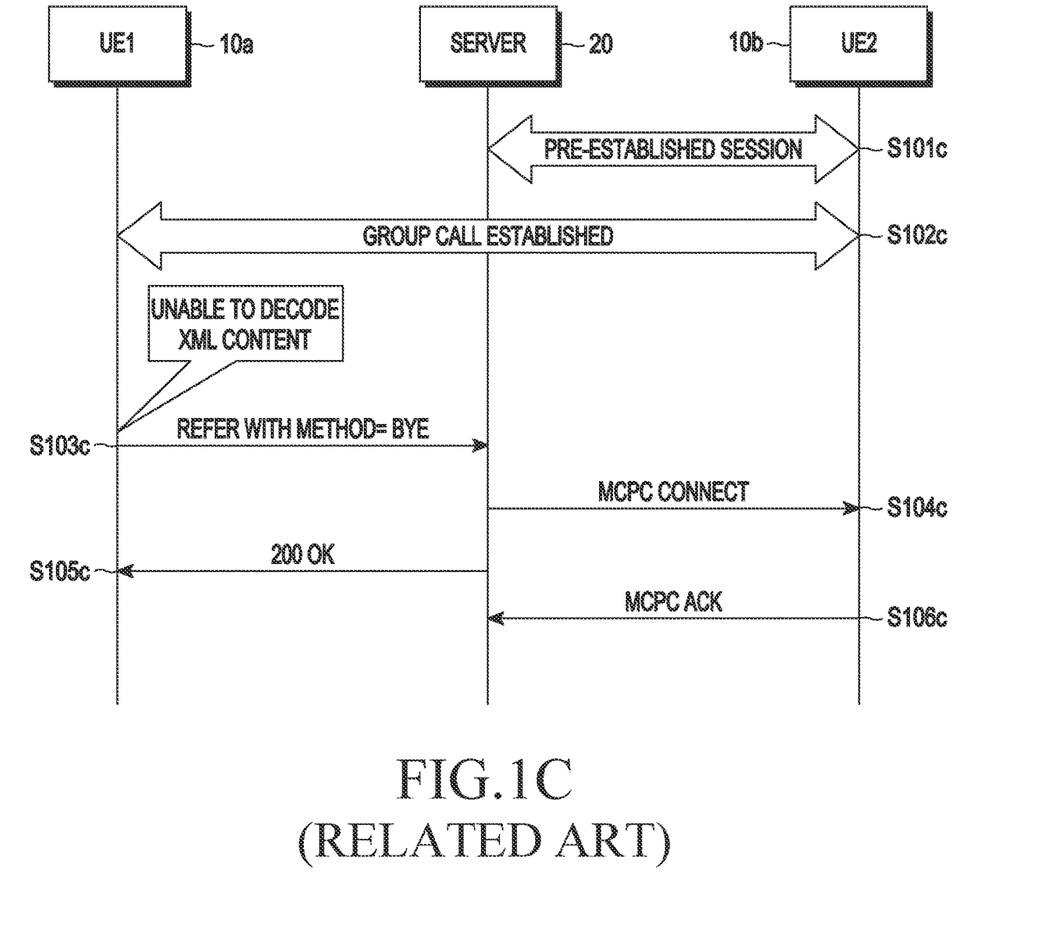
FIG. 1C is a sequence diagram illustrating a problem scenario in a group call where the first UE is unable to inform the second UE regarding the reason cause for decoding failure of an XML content using an MCPC disconnect message over the pre-established session in the MCX network, according to the related art.

In another example, consider a scenario in which the UE1 (10a) wants to establish the group call with the UE2 (10b) in the MCX network, as illustrates in FIG. 1C.

FIG. 1C is a sequence diagram illustrating a problem scenario in a group call where the first UE is unable to inform the second UE regarding the precise reason for decoding failure of an XML content using an MCPC disconnect message over the session ("pre-established session") in the MCX network, according to the related art.

Referring to FIG. 1C, at S101c-S102c, the pre-established session is established and the group call is initiated between the UE1 10a and the UE2 10b. At S103c-S106c, during the group call some Extensible Markup Language (XML) content decryption failed (e.g. conference XML as its encrypted using a Client Server Key (CSK) between the UE1 10a (client) and the server 20), the CSK is shared by the UE1 10a in a register request to the server 20, for encrypting the XML and floor messages that are exchanged between the client 10a and the server 20 to secure communication between the client 10a and the server 20.

In the existing method, there is no mechanism to convey the precise reason cause for the failure to the server 20 and/or the UE2 10b during the group call over the pre-established session. The only way to communicate/inform the failure of the group call is through the MCPC disconnect message, a TLV format of the existing MCPC disconnect message is shown in Table.2.

TABLE 2

| 0 | 1 | 2 | 3 |
|---|---|---|---|
| 0 1 2 3 4 5 6 7 8 9 | 0 1 2 3 4 5 6 7 8 9 | 0 1 2 3 4 5 6 7 8 9 | 0 1 |

| |V=2|P| Subtype | PT=APP=204 | Length | |
|---|
| SSRC of participating MCPTT function |
| name = MCPC |
| MCPTT Session Identity field |

Further, the existing MCPC disconnect message does not indicate the precise reason cause for the failure. In that scenario, the UE2 10b, the server 20, and/or the UE1 10a are unable to take necessary action to recover the group call from the failure. Thus, it is desired to provide at least one useful alternative for sharing the precise reason cause for the failure for any MCX communication over pre-established session in the MCX network.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and apparatus for sharing a reason cause for Mission Critical Communications (MCX) communication over pre-established session in an MCX network by adding a reason cause field in an MCPC acknowledgement message and an MCPC disconnect message. The reason cause field reveals an actual reason for a call rejection or disconnection to a User Equipment (UE) and/or server of the MCX network. Therefore, the reason cause field enables the UE and/or server to take corrective actions to recover from error scenario(s)/any other failures.

Another aspect of the disclosure is to enhance existing reason code field of the MCPC acknowledgement message to communicate any failures to call participants (UEs). Where values can be a subset from the reason code field that contains an answer to a pre-established session control message other than 'Accepted'.

Additional aspects will be set forth in part in the description which follows and, in part, will be apparent from the description, or may be learned by practice of the presented embodiments.

In accordance with an aspect of the disclosure, a method for sharing a reason cause for a mission critical communication (MCX) communication over pre-established session in an MCC network is provided. The method includes establishing, by a first user equipment (UE), a session with a server, transmitting, by the first UE to the server, a call initiation request message to initiate a call, wherein the call initiation request message includes first information on a call type and second information on a resource list, wherein the call initiation request message may be SIP REFER request. receiving, by the first UE from the server, a mission critical pre-established session control (MCPC) connect message including a security message, determining, by the first UE, whether an authentication for the security message is successful, and transmitting, by the first UE to the server, a first MCPC acknowledgement message including a reason cause field to inform a precise reason for terminating the call in response to determining that the authentication for the security message is not successful.

In an embodiment, the method further includes transmitting, to the server, a second MCPC acknowledgement message to establish the call over the session (which is pre-established) in response to determining that the authentication for the security message is successful.

In an embodiment, the call type includes one of a private call, a group call, an ambient call and a first-to-answer call and the resource list includes a list of second UE.

In an embodiment, the reason cause field includes a reason cause field Identity (ID), a reason cause length, and a reason cause value.

In an embodiment, the reason cause ID is a binary value and is set to 00000111.

In an embodiment, the reason cause length is a binary value and have a value '2' indicating a total length in octets of the reason cause value in the reason cause field.

In an embodiment, the reason cause value is a 16-bit binary value, and wherein the reason cause value includes at least one of a first value indicating the precise reason as "busy", a second value indicating the precise reason as "the authentication of the security message failed", a third value indicating the precise reason as "unable to decrypt XML content", a fourth value indicating the precise reason as "inactivity timer expired", a fifth value indicating the precise reason as "there are only one or no participants in a mission critical push-to-talk (MCPTT) call", a sixth value indicating the precise reason as "a minimum number of affiliated MCPTT group members in not present", a seventh value indicating the precise reason as "group call timer expired", and an eighth value indicating the precise reason as "a MCPTT session has lasted longer than maximum duration of a private call".

In accordance with another aspect of the disclosure, a method for sharing reason cause for a mission critical communication (MCX) communication over pre-established session in an MCC network is provided. The method includes establishing, by a server, the session ("pre-established session") with a first user equipment (UE), receiving, by the server from the first UE, a call initiation request message to initiate a call, wherein the call initiation request message includes first information on a call type and second information on a resource list, wherein the call initiation request message may be SIP REFER request. Transmitting, by the server to a second UE, a first mission critical pre-established session control (MCPC) connect message based on the first information on the call type and the second information on the resource list, receiving, by the server from the second UE, a first MCPC acknowledgement message including a security message for successful reception of a first MCPC connect in response to transmitting the first MCPC connect message, transmitting, by the server to the first server, a second MCPC connect message including the security message, receiving, by the server from the first UE, a second MCPC acknowledgement message including a reason cause field to inform a precise reason for terminating the call in response to an authentication for the security message being not successful; and transmitting, by the server to the second UE, a first MCPC disconnect message including the reason cause field.

In an embodiment, the method further includes receiving, by the server from the first UE, a third MCPC acknowledgement message to establish the call over the session ("pre-established session") in response to the authentication for the security message being successful.

In an embodiment, the call type includes one of a private call, a group call, an ambient call and a first-to-answer call and the resource list includes a list of second UE.

In an embodiment, the reason cause field includes a reason cause field Identity (ID), a reason cause length, and a reason cause value.

In an embodiment, the reason cause ID is a binary value and is set to 00000111.

In an embodiment, the reason cause length is a binary value and have a value '2' indicating a total length in octets of the reason cause value in the reason cause field.

In an embodiment, the reason cause value is a 16-bit binary value, and wherein the reason cause value includes at least one of a first value indicating the precise reason as "busy", a second value indicating the precise reason as "the authentication of the security message failed", a third value indicating the precise reason as "unable to decrypt XML content", a fourth value indicating the precise reason as "inactivity timer expired", a fifth value indicating the precise reason as "there are only one or no participants in a mission critical push-to-talk (MCPTT) call", a sixth value indicating the precise reason as "a minimum number of affiliated MCPTT group members in not present", a seventh value indicating the precise reason as "group call timer expired", and an eighth value indicating the precise reason as "a MCPTT session has lasted longer than maximum duration of a private call".

In accordance with another aspect of the disclosure, a first user equipment (UE) for sharing a reason cause for a mission critical communication (MCX) communication over pre-established session in an MCC network is provided. The first UE includes a transceiver, and at least one processor configured to establish the session("pre-established session") with a server, control the transceiver to transmit, to a server, a call initiation request message to initiate a call, wherein the call initiation request message includes first information on a call type and second information on a resource list, control the transceiver to receive, from the server, a mission critical pre-established session control (MCPC) connect message including a security message, determine whether an authentication for the security message is successful, and control the transceiver to transmit, to the server, a first MCPC acknowledgement message including a reason cause field to inform a precise reason for terminating the call in response to determining that the authentication for the security message is not successful.

In accordance with another aspect of the disclosure, a server for sharing a reason cause for a mission critical communication (MCX) communication over pre-established session in an MCC network is provided. The server includes a transceiver, and at least one processor configured to establish the session ("pre-established session") with a first user equipment (UE), control the transceiver to receive, from the first UE, a call initiation request message to initiate a call, wherein the call initiation request message includes first information on a call type and second information on a resource list, wherein the call initiation request message may be SIP REFER request, control the transceiver to transmit, to a second UE, a first mission critical pre-established session control (MCPC) connect message based on the first information on the call type and the second information on the resource list, control the transceiver to receive, from the second UE, a first MCPC acknowledgement message including a security message for successful reception of a first MCPC connect in response to transmitting the first MCPC connect message, control the transceiver to transmit, to the first server, a second MCPC connect message including the security message, control the transceiver to receive, from the first UE, a second MCPC acknowledgement message including a reason cause field to inform a precise reason for terminating the call in response to an authentication for the security message being not successful, and control the transceiver to transmit, to the second UE, a first MCPC disconnect message including the reason cause field.

Other aspects, advantages, and salient features of the disclosure will become apparent to those skilled in the art from the following detailed description, which, taken in conjunction with the annexed drawings, discloses various embodiments of the disclosure.

Before undertaking the detailed description below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of A, B, and C" includes any of the following combinations A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Throughout this disclosure, the terms "first UE" and "UE1" are used interchangeably and mean the same. The terms "second UE" and "UE2" are used interchangeably and mean the same.

Accordingly, the embodiment herein is to provide a method for sharing a reason cause for a mission critical communication (MCX) communication over pre-established session in an MCC network. The method comprises: establishing, by a first user equipment (UE), the session ("pre-established session") with a server; transmitting, by the first UE to the server, a call initiation request message to initiate a call, wherein the call initiation request message includes first information on a call type and second information on a resource list, wherein the call initiation request message may be SIP REFER request; receiving, by the first UE from the server, a mission critical pre-established session control (MCPC) connect message including a security message; determining, by the first UE, whether authentication for the security message is successful; and transmitting, by the first UE to the server, a first MCPC acknowledgement message including a reason cause field to inform a precise reason for terminating the call in response to determining that the authentication for the security message is not successful.

Accordingly, the embodiment herein is to provide a method for sharing a reason cause for a mission critical communication (MCX) communication over pre-established session in an MCC network. The method comprises: establishing, by a server, the session ("pre-established session") with a first user equipment (UE); receiving, by the server from the first UE, a call initiation request message to initiate a call, wherein the call initiation request message includes first information on a call type and second information on a resource list, wherein the call initiation request message may be SIP REFER request; transmitting, by the server to a second UE, a first mission critical pre-established session control (MCPC) connect message based on the first information on the call type and the second information on the resource list; receiving, by the server from the second UE, a first MCPC acknowledgement message including a security message for successful reception of a first MCPC connect in response to transmitting the first MCPC connect message; transmitting, by the server to the first server, a second MCPC connect message including the security message; receiving, by the server from the first UE, a second MCPC acknowledgement message including a reason cause field to inform a precise reason for terminating the call in response to an authentication for the security message being not successful; and transmitting, by the server to the second UE, a first MCPC disconnect message including the reason cause field.

Accordingly, the embodiment herein is to provide a first user equipment (UE) for sharing a reason cause of a mission critical communication (MCX) communication over pre-established session in an MCC network. The first UE comprises: a transceiver; and at least one processor configured to establish the session ("pre-established session") with a server; control the transceiver to transmit, to a server, a call initiation request message to initiate a call, wherein the call initiation request message includes first information on a call type and second information on a resource list, wherein the call initiation request message may be SIP REFER request; control the transceiver to receive, from the server, a mission critical pre-established session control (MCPC) connect message including a security message; determine whether authentication for the security message is successful; and control the transceiver to transmit, to the server, a first MCPC acknowledgement message including a reason cause field to inform a precise reason for terminating the call in response to determining that the authentication for the security message is not successful.

Accordingly, the embodiment herein is to provide a server for sharing a reason cause of a mission critical communication (MCX) communication over pre-established session in an MCC network. The server comprises: a transceiver; and at least one processor configured to: establish the session ("pre-established session") with a first user equipment (UE); control the transceiver to receive, from the first UE, a call initiation request message to initiate a call, wherein the call initiation request message includes first information on a call type and second information on a resource list, wherein the call initiation request message may be SIP REFER request; control the transceiver to transmit, to a second UE, a first mission critical pre-established session control (MCPC) connect message based on the first information on the call type and the second information on the resource list; control the transceiver to receive, from the second UE, a first MCPC acknowledgement message including a security message for successful reception of a first MCPC connect in response to transmitting the first MCPC connect message; control the transceiver to transmit, to the first server, a second MCPC connect message including the security message; control the transceiver to receive, from the first UE, a second MCPC acknowledgement message including a reason cause field to inform a precise reason for terminating the call in response to an authentication for the security message being not successful; and control the transceiver to transmit, to the second UE, a first MCPC disconnect message including the reason cause field.

Unlike existing methods and systems, the proposed method allows the UE to share the reason cause for the MCX communication over the pre-established session in the MCX network by adding the reason cause field in the MCPC acknowledgement message. The reason cause field reveals an actual reason for (or cause of) a call rejection or disconnection to the second UE and/or server of the MCX network. This permits the first UE and/or the second UE, and/or server to take corrective actions to recover from error scenario(s)/any other failures.

Unlike existing methods and systems, the proposed method allows the server to share the reason cause for the MCX communication over the pre-established session in the MCX network by adding the reason cause field in the MCPC disconnect message. The reason cause field reveals the actual reason for the call rejection or disconnection to the first UE and/or the second UE of the MCX network. This permits the first UE and/or the second UE, and/or server takes corrective actions to recover from error scenario(s)/any other failures.

Unlike existing methods and systems, the proposed method enhances the existing reason code field of the MCPC acknowledgement message to communicate any failures to call participants (UEs). Where values can be a subset from the reason code field that contains an answer to a pre-established session control message other than 'Accepted'.

Referring now to the drawings and more particularly to FIGS. 2A through 4, where similar reference characters denote corresponding features consistently throughout the figures, there are shown preferred embodiments.

Figure 2A:
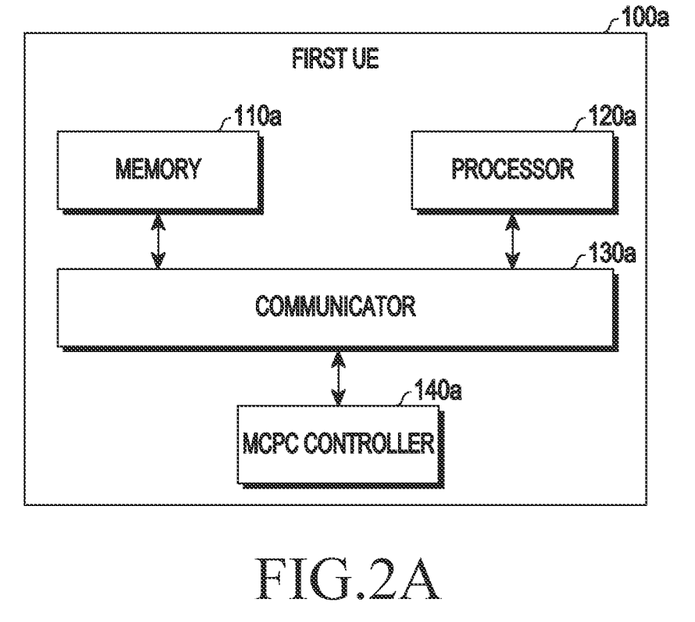
FIG. 2A illustrates a block diagram of the first UE for sharing a reason cause for an MCX communication over the pre-established session in the MCX network, according to an embodiment of the disclosure.

FIG. 2A illustrates a block diagram of a first UE for sharing a reason cause for the MCX communication over the pre-established session in the MCX network, according to an embodiment of the disclosure.

Referring to FIG. 2A, examples of the first UE 100a) include, but are not limited to a smart phone, a tablet computer, a Personal Digital Assistant (PDA), an Internet of Things (IoT) device, a wearable device, etc.

The first UE 100a includes a memory 110a, a processor 120a, a communicator 130a, and an MCPC controller 140a.

The memory 110a is configured to store information associated with a pre-established session (e.g. an authentication key, a value of integrity protection check, decryption of XML content, expiry value of an inactivity timer, information relates to a number of UE(s) are not-present/present in the MCX communication, expiry value of a group call timer, and a pre-established session timer, etc.), a call type and a resource list. The memory 110a stores instructions to be executed by the processor 120a. The memory 110a may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 110a may, in some examples, be considered a non-transitory storage medium. The term "non-transitory" may indicate that the storage medium is not embodied in a carrier wave or a propagated signal. However, the term "non-transitory" should not be interpreted that the memory 10a is non-movable. In some examples, the memory 110a can be configured to store larger amounts of information than the memory. In certain examples, a non-transitory storage medium may store data that can, over time, change (e.g., in Random Access Memory (RAM) or cache). The memory 110a can be an internal storage unit or it can be an external storage unit of the UE 100, a cloud storage, or any other type of external storage.

The processor 120a communicates with the memory 110a, the communicator 130a, and the MCPC controller 140a. The processor 120a is configured to execute instructions stored in the memory 110a and to perform various processes. The processor may include one or a plurality of processors, maybe a general-purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

The communicator 130a is configured to communicate internally between internal hardware components and with external devices (e.g. server) via one or more networks (e.g. Radio technology). The communicator 130a includes an electronic circuit specific to a standard that enables wired or wireless communication.

The MCPC controller 140a is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In an embodiment, the MCPC controller 40a is configured to establish the session ("pre-established session") by sending a pre-established session request to a server 200. The Further, the MCPC controller 140a is configured to initiate a call by sending a call initiation request to the server 200. The call initiation request includes the call type and the resource list. The call initiation request may be SIP REFER request The call type includes a private call, a group call, an ambient call and a first-to-answer call. The resource list includes a list of second UE 100b. Further, the MCPC controller 140a is configured to receive an MCPC connect message from the server 200, the MCPC connect message includes a security message (e.g. MIKEY-SAKKE I_MESSAGE).

The MCPC controller 140a is configured to determine whether the authentication of the security message is successful. The MCPC controller 140a is configured to send an MCPC acknowledgement message to the server 200 with a reason cause field to inform a precise reason for a call termination in response to determining that the authentication of the security message is not successful. The reason cause field includes a reason cause field Identity (ID), a reason cause length, and a reason cause value. The reason cause field includes the reason cause value to describe the precise reason for the call termination over the pre-established session. The reason cause field in the MCPC acknowledgement message notifies the call termination reason to one of the second UE 100b and the server 200 to take corrective action to recover from the authentication failure. The MCPC controller 140a is configured to send the MCPC acknowledgement message to the server 200 to establish the call over the pre-established session in response to determining that the authentication of the security message is successful.

The MCPC controller 140a is configured to detect a failure after establishing the session ("pre-established session"). The MCPC controller 140a is configured to send the MCPC acknowledgement message to the server 200 with the reason cause field to inform the precise reason for the call termination. The detected failure includes one of authentication of the MIKEY-SAKKE I_MESSAGE, an integrity protection check, decryption of Extensible Markup Language (XML) content, an expiration of inactivity timer, only one or no UEs in the call, a minimum number of UEs are not present in the group call, a group call timer expired, and the pre-established session has lasted longer than the maximum duration of the private call. The reason cause field in the MCPC acknowledgement message notifies the call termination reason to one of the second UE 100b and the server 200 to take corrective action to recover from the failure. The MCPC acknowledgement message includes a reason code field. The reason code field includes a reason code field ID, a reason code length, and a reason code value. The reason code value includes one of an accepted value, a busy value, a not accepted value, an authentication of the MIKEY-SAKKE I_MESSAGE failed value, an integrity protection check failed value, and decrypting XML content failed value. The reason cause field includes a value corresponding to the reason code value when the reason code value is other than the accepted value.

Although FIG. 2A shows various hardware components of the first UE 100a, it is to be understood that other embodiments are not limited thereto. In other embodiments, the first UE 100a may include a greater or lesser number of components. Further, the labels or names of the components are used only for illustrative purposes and does not limit the scope of the disclosure. One or more components can be combined together to share the reason cause for the MCX communication over the pre-established session in the MCX network.

Referring to FIG. 2A, the same functionality is applicable to the second UE 100b. The second UE 100b sends the MCPC acknowledgement message to the server 200 with the reason cause field to inform the precise reason for the call termination in response to detecting the failure after establishing the session ("pre-established session").

Figure 2B:
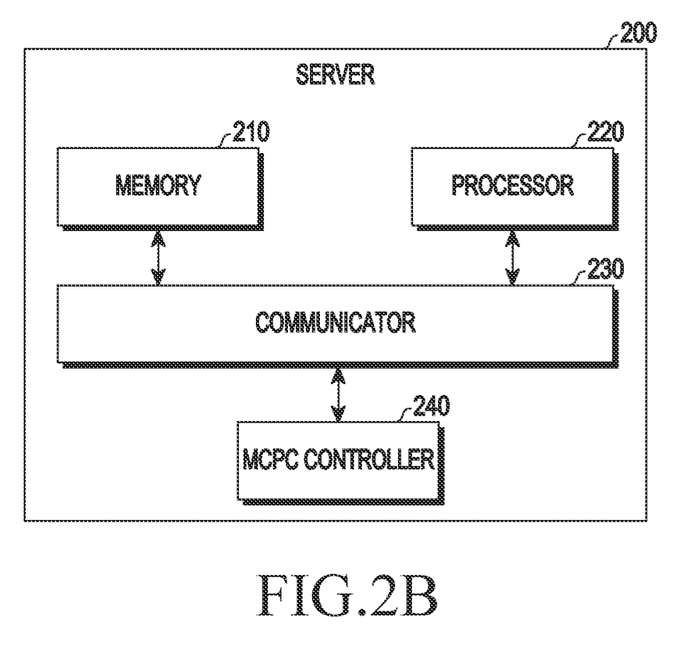
FIG. 2B illustrates a block diagram of a server for sharing a reason cause for the MCX communication over the pre-established session in the MCX network, according to an embodiment of the disclosure.

FIG. 2B illustrates a block diagram of a server (e.g. Mission-critical push-to-talk (MCPTT) server) for sharing a reason cause for the MCX communication over the pre-established session in the MCX network, according to an embodiment of the disclosure.

Referring to FIG. 2B, the server 200 includes a memory 210, a processor 220, a communicator 230, and an MCPC controller 240.

The memory 210 is configured to store information associated with the pre-established session (e.g. the authentication key, the value of integrity protection check, the decryption of XML content, expiry value of the inactivity timer, information relating to a number of UE(s) that are not-present/present in the MCX communication, expiration value of the group call timer, and the pre-established session timer, etc.), the call type and the resource list. The memory 210 stores instructions to be executed by the processor 220. The memory 210 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 210 may, in some examples, be considered a non-transitory storage medium. The term "non-transitory" may indicate that the storage medium is not embodied in a carrier wave or a propagated signal. However, the term "non-transitory" should not be interpreted that the memory 210) is non-movable. In some examples, the memory 210 can be configured to store larger amounts of information than the memory. In certain examples, a non-transitory storage medium may store data that can, over time, change (e.g., in Random Access Memory (RAM) or cache). The memory 210 can be an internal storage unit or it can be an external storage unit of the UE 100, a cloud storage, or any other type of external storage.

The processor 220 communicates with the memory 210, the communicator 230, and the MCPC controller 240. The processor 220 is configured to execute instructions stored in the memory 210 and to perform various processes. The processor may include one or a plurality of processors, such as a general-purpose processor, such as a CPU, an AP, or the like, a graphics-only processing unit such as a GPU, a VPU, and/or an AI dedicated processor such as a NPU.

The communicator 230 is configured for communicating internally between internal hardware components and with external devices (e.g. first UE 100a and second UE 100b) via one or more networks (e.g. Radio technology). The communicator 230 includes an electronic circuit specific to a standard that enables wired or wireless communication.

The MCPC controller 40 may be implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In an embodiment, the MCPC controller 240 is configured to receive the MCPC acknowledgement message from the first UE 100a and/or the second UE 100b. The MCPC controller 240 is configured to determine whether the received MCPC acknowledgement message includes the reason cause field. The MCPC controller 240 is configured to send an MCPC disconnect message with the reason cause field to the first UE 100a and/or the second UE 100b from the resource list in response to determining that the received MCPC acknowledgement message includes the reason cause field. The MCPC controller 240 is configured to establish the call over the pre-established session in response to determining that the received MCPC acknowledgement message does not include the reason cause field.

The MCPC controller 240 is configured to detect a failure after establishing the session ("pre-established session"). The MCPC controller 240 is configured to send the MCPC disconnect message to the first UE 100a and/or the second UE 100b with the reason cause field to inform the precise reason for the call termination.

Although FIG. 2B shows various hardware components of the server 200, it is to be understood that other embodiments are not limited thereto. In other embodiments, the server 200 may include a greater or lesser number of components. Further, the labels or names of the components are used only for illustrative purpose and does not limit the scope of the disclosure. One or more components can be combined together to share the reason cause for the MCX communication over the pre-established session in the MCX network.

Figure 3A:
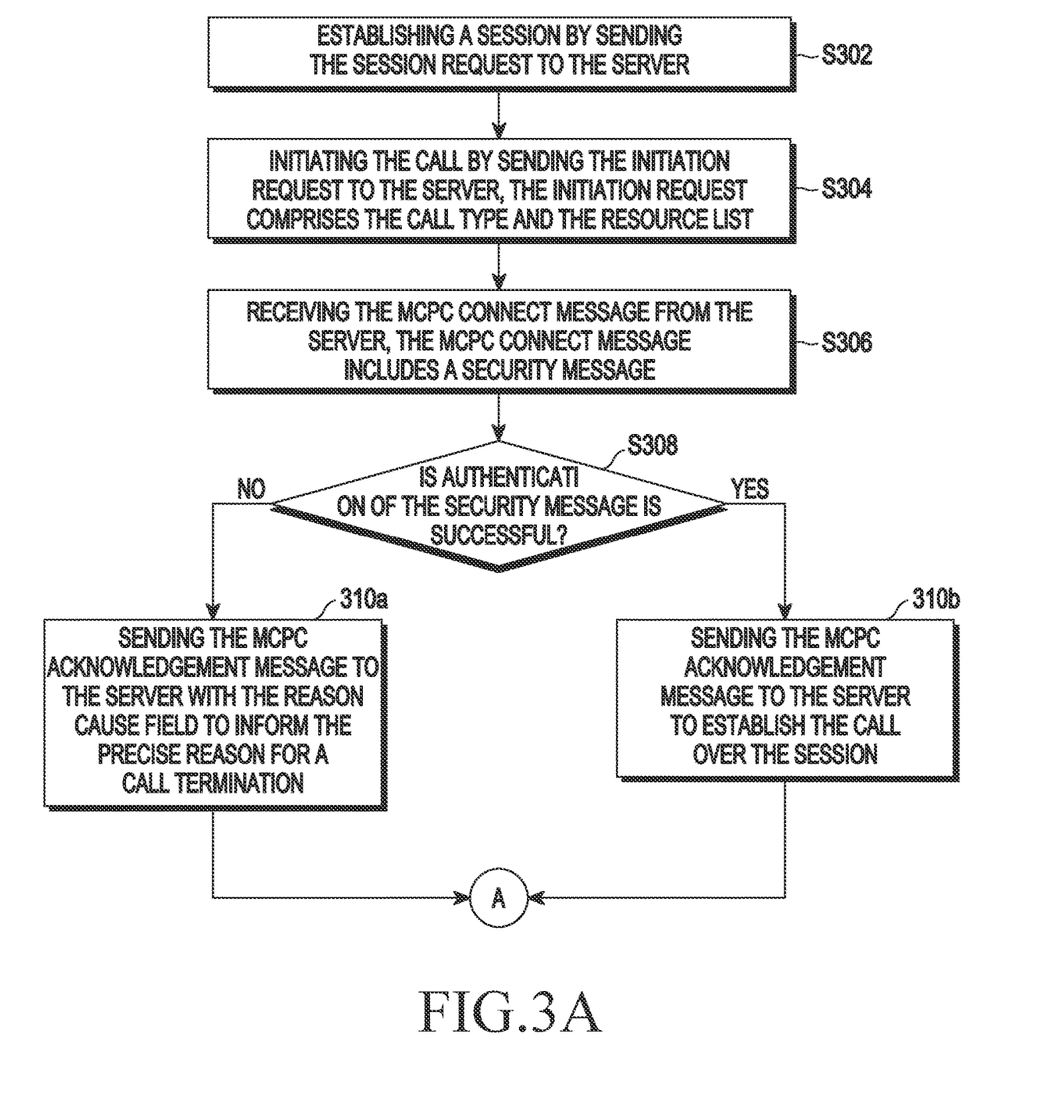
FIGS. 3A and 3B are flow diagrams illustrating a method for sharing a reason cause for the MCX communication over the pre-established session in the MCX network, according to various embodiments of the disclosure.
Figure 3B:
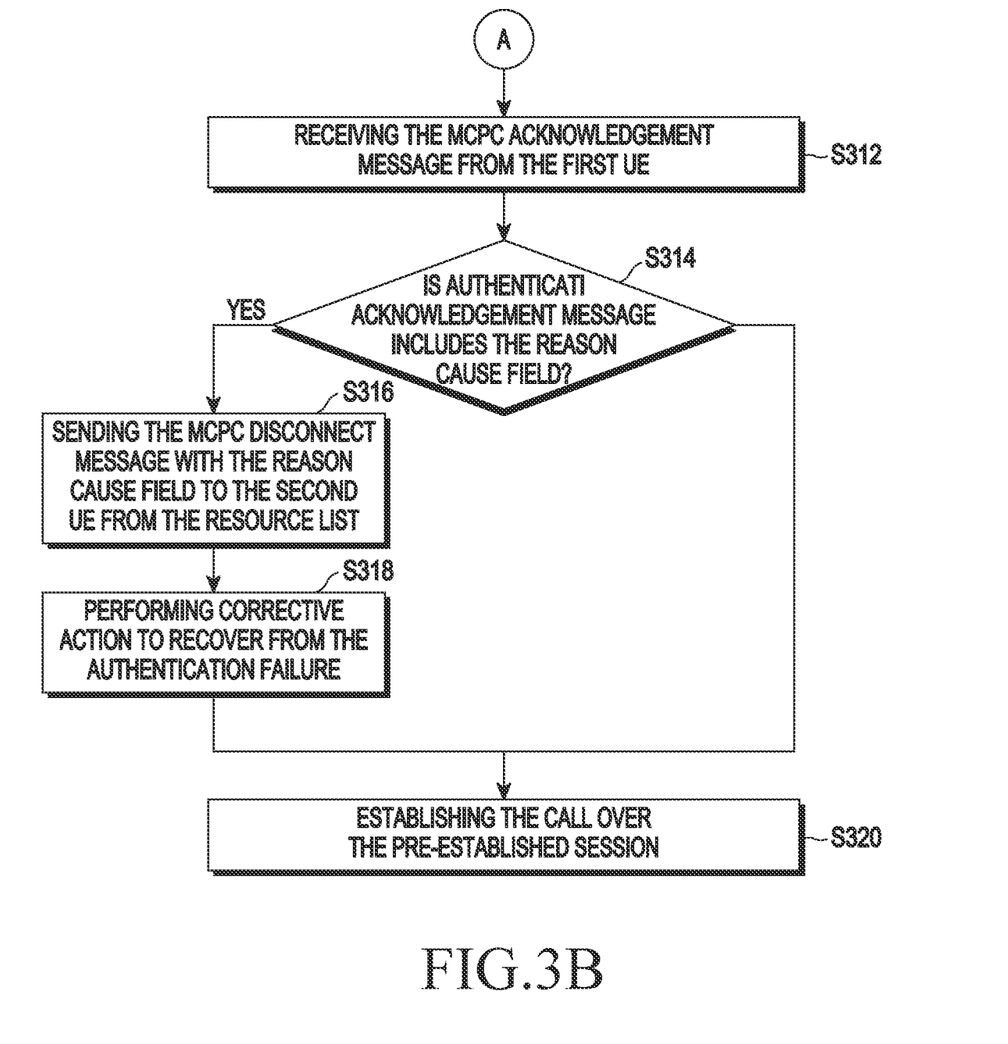

FIGS. 3A and 3B are flow diagrams 300 illustrating a method for sharing the reason cause for the MCX communication over the pre-established session in the MCX network, according to various embodiments of the disclosure.

Referring to FIG. 3A, at operation S302, the session ("pre-established session") is established by sending the pre-established session request to the server 200. At operation S304, the call is initiated by sending the call initiation request (or initiation request) to the server 200. The call initiation request includes the call type and the resource list. The call initiation request may be SIP REFER request. At operation S306, the MCPC connect message is received from the server 200. The MCPC connect message includes the security message. At operation S308, the method includes determining whether authentication of the security message is successful. At operation S310a, the MCPC acknowledgement message is sent to the server 200 with the reason cause field to inform the precise reason for the call termination in response to determining that the authentication of the security message is not successful. At operation S310b, the MCPC acknowledgement message is sent to the server 200 to establish the call over the session that is pre-established ("pre-established session") in response to determining that the authentication of the security message is successful.

Referring to FIG. 3B, at operation S312, the MCPC acknowledgement message is received from the first UE 100a. At operation S314, it is determined whether the received MCPC acknowledgement message includes the reason cause field. At operation S316, the MCPC disconnect message including the reason cause field is sent to the second UE 100b from the resource list in response to determining that the received MCPC acknowledgement message includes the reason cause field. At operation S318, corrective action is performed to recover from the authentication failure. At operation S320, the call is established over the session that is pre-established in response to determining that the received MCPC acknowledgement message does not include the reason cause field or the corrective action to recover from the authentication failure.

The various actions, acts, blocks, steps, or the like in the flow diagram 300 may be performed in the order presented, in a different order or simultaneously. Further, in some embodiments, some of the actions, acts, blocks, steps, or the like may be omitted, added, modified, skipped, or the like without departing from the scope of the disclosure.

Figure 4:
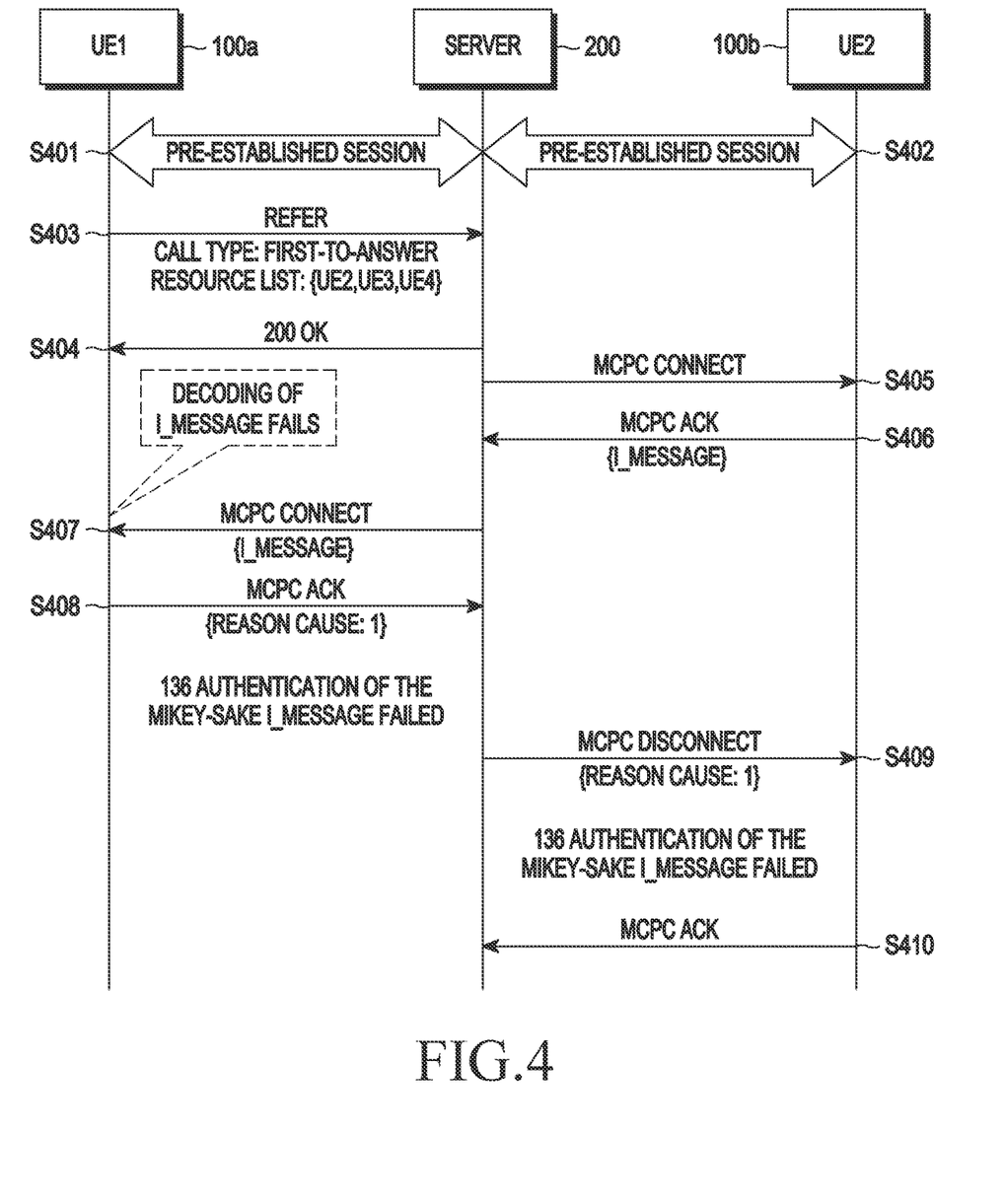
FIG. 4 is a sequence diagram illustrating the method for sharing a reason cause for the MCX communication over the pre-established session in the MCX network, according to an embodiment of the disclosure.

FIG. 4 is a sequence diagram illustrating the method for sharing a reason cause for the MCX communication over the pre-established session in the MCX network, according to an embodiment of the disclosure.

Referring to FIG. 4, at operations S401-402, the session is established between the server 200 and the UEs 100a, and 100b to any communication; the session can later be used for any MCX calls (e.g. a private call, a group call, an ambient call, and the first-to-answer call, etc.). The session may be called "pre-established session". At operation S403, the UE1 100a sends the call initiation request to the server 200. The call initiation request includes multiple potential target recipients (i.e., UE2 100b)/a list of other users with an intention to establish the call. As soon as one of the potential target recipients accepts the call, the rest of the call will be terminated. The call initiation request message may be SIP REFER request. At operation S404, the server 200 sends the acknowledgement message to the UE1 100a in response to receiving the call initiation request.

At operations S405-S406, the server 200 sends the MCPC connect message to the UE2 100b and receives the MCPC acknowledgement message from the UE2 100b for successful reception of the MCPC connect. In the first-to-answer call, only the UE2 100b generates and send security parameter (e.g. I_MESSAGE for sharing SRTP keys) to the UE1 100a as the UE1 100a does not know which potential target recipients accept the call first. At operation S407, the UE1 100a receives the MCPC connect message from the server 200 for successful reception of the MCPC acknowledgement message and detects authentication failure of the security message. At operation S408, the UE1 100a sends the MCPC acknowledgement message to the server 200 with the reason cause field (i.e. "1: authentication of the MIKEY-SAKKE I_MESSAGE failed") to inform a precise reason for the call termination.

The proposed method adds the reason cause field in the MCPC acknowledgement message to communicate the call rejection reason to originating participant (i.e. UE2 100b) of the call A TLV format of the proposed MCPC acknowledgement message is shown in Table. 3.

TABLE 3

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+--
|V=2|P| Subtype | PT=APP=204  |              Length             |
+-+-+-+-+-+-+-+-+-+-+-+-+-+-+-+-+-+-+-+-+-+-+-+-+-+-+-+-+-+-+-+--
|                    SSRC of floor participant                  |
+-+-+-+-+-+-+-+-+-+-+-+-+-+-+-+-+-+-+-+-+-+-+-+-+-+-+-+-+-+-+-+--
|                           name = MCPC                         |
+-+-+-+-+-+-+-+-+-+-+-+-+-+-+-+-+-+-+-+-+-+-+-+-+-+-+-+-+-+-+-+--
|                      Reason Code field                        |
+-+-+-+-+-+-+-+-+-+-+-+-+-+-+-+-+-+-+-+-+-+-+-+-+-+-+-+-+-+-+-+--
|                      Reason Cause field                       |
+-+-+-+-+-+-+-+-+-+-+-+-+-+-+-+-+-+-+-+-+-+-+-+-+-+-+-+-+-+-+-+--
```

The reason cause field includes the reason cause field ID, the reason cause length, and the reason cause value. A TLV format of the proposed reason cause field is shown in Table. 4 and 4a.

TABLE 4

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+--
| Reason Cause  | Reason Cause  |      Reason Cause value       |
| field ID value|  length value |                               |
+-+-+-+-+-+-+-+-+-+-+-+-+-+-+-+-+-+-+-+-+-+-+-+-+-+-+-+-+-+-+-+--
```

TABLE 4a

| | | Field ID | |
|---|---|---|---|
| Field name | | Decimal | Binary |
| Media Streams | | 0 | 00000000 |
| MCPTT Session Identity | | 1 | 00000001 |
| Warning Text | | 2 | 00000010 |
| MCPTT Group Identity | | 3 | 00000011 |
| Answer State | | 4 | 00000100 |
| Inviting MCPTT User Identity | | 5 | 00000101 |
| Reason Code | | 6 | 00000110 |
| PCK I_MESSAGE | | 192 | 11000000 |
| Reason Cause | | 7 | 00000111 |

In an embodiment, the reason cause field values are 7 decimal value (binary value 00000111), the reason cause field ID is a binary value and may be set according to above table, the reason cause length is a binary value and may have the value '2' indicating the total length in octets of the <Reason Cause> value item, and the reason cause value is a 16-bit binary value with the following values shown in Table 5:

TABLE 5

| Value | Reason cause |
|---|---|
| 0 | Busy |
| 1 | Authentication of the MIKEY-SAKKE I_MESSAGE failed |
| 2 | Integrity protection check failed |
| 3 | Unable to decrypt XML content |
| 4 | Inactivity timer expired |
| 5 | There are only one or no participants in the MCPTT call |
| 6 | The minimum number of affiliated MCPTT group members is not present |
| 7 | Group call timer expired |
| 8 | The MCPTT session has lasted longer than the maximum duration of a private call |

In an embodiment, the reason code field includes a reason code field ID, a reason code length, and a reason code value. The reason code value includes one of an accepted value, a busy value, a not accepted value, an authentication of the MIKEY-SAKKE I_MESSAGE failed value, an integrity protection check failed value, decrypting XML content failed value, and other values are reserved for future use. Furthermore, if a reason code field was received in the MCPC acknowledge message with other than an 'Accepted' reason code value, the reason cause field with a value corresponding to the error scenario is added.

At operations S409-S410, the server 200 sends the MCPC disconnect message with the reason cause field to the second UE 100b from the resource list in response to determining that the received MCPC acknowledgement message includes the reason cause field.

The proposed method adds the reason cause field in the MCPC disconnect message to communicate the call rejection reason to originating participant (i.e. UE2 100b) of the call. A TLV format of the proposed MCPC acknowledgement message is shown in Table. 6.

TABLE 6

```
    0                   1                   2                   3
    0 1 2 3 4 5 6 7 8 9 0 1 2 3 4 5 6 7 8 9 0 1 2 3 4 5 6 7 8 9 0 1
   +-+-+-+-+-+-+-+-+-+-+-+-+-+-+-+-+-+-+-+-+-+-+-+-+-+-+-+-+-+-+-+-+
   |V=2|P| Subtype |   PT=APP=204  |             Length            |
   +-+-+-+-+-+-+-+-+-+-+-+-+-+-+-+-+-+-+-+-+-+-+-+-+-+-+-+-+-+-+-+-+
   |            SSRC of floor participating MCPTT function         |
   +-+-+-+-+-+-+-+-+-+-+-+-+-+-+-+-+-+-+-+-+-+-+-+-+-+-+-+-+-+-+-+-+
   |                          name = MCPC                          |
   +-+-+-+-+-+-+-+-+-+-+-+-+-+-+-+-+-+-+-+-+-+-+-+-+-+-+-+-+-+-+-+-+
   |                    MCPTT Session Identity field               |
   +-+-+-+-+-+-+-+-+-+-+-+-+-+-+-+-+-+-+-+-+-+-+-+-+-+-+-+-+-+-+-+-+
   |                        Reason Cause field                     |
   +-+-+-+-+-+-+-+-+-+-+-+-+-+-+-+-+-+-+-+-+-+-+-+-+-+-+-+-+-+-+-+-+
```

In an embodiment, based on the received reason cause field in the MCPC acknowledgement message and the MCPC disconnect message notifies the call termination reason to the second UE 100b and the server 200 to take corrective action to recover from the authentication failure or any other failure.

In an embodiment, the proposed reason cause field is not just restricted to MCX communication setup over the pre-established session failure. The reason cause field may also be extended for any use cases that requires usage of the MCPC acknowledgement message and the MCPC disconnect message.

The embodiments disclosed herein can be implemented using at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a first user equipment (UE) in a wireless communication system, the method comprising:
transmitting, to a server, an initiation request to initiate a mission critical push-to-talk (MCPTT) call over a pre-established session;
receiving, from the server, a mission critical pre-established session control (MCPC) connect message including a MIKEY-SAKKE I_MESSAGE; and
transmitting, to the server, an MCPC acknowledgement message including a reason code field containing a reason for rejecting the MCPTT call in response to determining that the first UE does not accept the MCPTT call based on the received MCPC connect message,
wherein the reason code field includes a reason code field identity, a reason code length, and a reason code value, and
wherein the reason code value is one of a plurality of predetermined values, and the plurality of predetermined values comprise at least one of:
a first value indicating "authentication of the MIKEY-SAKKE I MESSAGE failed,"
a second value indicating "integrity protection check failed," or
a third value indicating "unable to decrypt XML content".

2. The method of claim 1, further comprising:
transmitting, to the server, an MCPC acknowledgement message with the reason code field set to "Accepted" in response to determining that the first UE accepts the MCPTT call.

3. The method of claim 1,
wherein the initiation request includes a type of the MCPTT call and resource list,
wherein the type of the MCPTT call includes one of a private call and a first-to-answer call, and
wherein the resource list includes information of other UEs.

4. The method of claim 1, wherein the initiation request is a session initiation protocol (SIP) REFER request.

5. A method performed by a server in a wireless communication system, the method comprising:
receiving, from a first user equipment (UE), an initiation request to initiate a mission critical push-to-talk (MCPTT) call over a pre-established session;
transmitting, to a second UE, a first mission critical pre-established session control (MCPC) connect message;

receiving, from the second UE, a first MCPC acknowledgement message in response to transmitting the first MCPC connect message;

transmitting, to the first UE, a second MCPC connect message including a MIKEY-SAKKE I_MESSAGE;

receiving, from the first UE, a second MCPC acknowledgement message including a reason code field containing a reason for rejecting the MCPTT call; and transmitting, to the second UE, a first MCPC disconnect message including the reason code field, wherein the reason code field includes a reason code field identity, a reason code length, and a reason code value, and wherein the reason code value is one of a plurality of predetermined values, and the plurality of predetermined values comprise at least one of:
- a first value indicating "authentication of the MIKEY-SAKKE I_MESSAGE failed,"
- a second value indicating "integrity protection check failed," or
- a third value indicating "unable to decrypt XML content".

6. The method of claim 5, further comprising:
receiving, from the first UE, a third MCPC acknowledgement message with the reason code field set to "Accepted" in response to the MCPTT call being accepted by the first UE.

7. The method of claim 5,
wherein the initiation request includes a type of the MCPTT call and resource list,
wherein the type of the MCPTT call includes one of a private call and a first-to-answer call, and
wherein the resource list includes information of other UEs including the second UE.

8. The method of claim 5, wherein the initiation request is a session initiation protocol (SIP) REFER request.

9. A first user equipment (UE) in a wireless communication, the first UE comprising:
a transceiver; and
at least one processor coupled to the transceiver,
wherein the at least one processor is configured to:
transmit, to a server, an initiation request to initiate a mission critical push-to-talk (MCPTT) call over a pre-established session,
receive, from the server, a mission critical pre-established session control (MCPC) connect message including a MIKEY-SAKKE I_MESSAGE, and
transmit, to the server, an MCPC acknowledgement message including a reason code field containing a reason for rejecting the MCPTT call in response to determining that the first UE does not accept the MCPTT call based on the received MCPC connect message,
wherein the reason code field includes a reason code field identity, a reason code length, and a reason code value, and wherein the reason code value is one of a plurality of predetermined values, and the plurality of predetermined values comprise at least one of:
- a first value indicating "authentication of the MIKEY-SAKKE I_MESSAGE failed,"
- a second value indicating "integrity protection check failed," or
- a third value indicating "unable to decrypt XML content".

10. The first UE of claim 9,
wherein the initiation request includes a type of the MCPTT call and resource list,
wherein the type of the MCPTT call includes one of a private call and a first-to-answer call, and
wherein the resource list includes information of other UEs.

11. The first UE of claim 9, wherein the initiation request is a session initiation protocol (SIP) REFER request.

12. A server in a wireless communication, the server comprising:
a transceiver; and
at least one processor coupled to the transceiver,
wherein the at least one processor is configured to:
receive, from a first user equipment (UE), an initiation request to initiate a mission critical push-to-talk (MCPTT) call over a pre-established session,
transmit, to a second UE, a first mission critical pre-established session control (MCPC) connect message,
receive, from the second UE, a first MCPC acknowledgement message including a MIKEY-SAKKE I_MESSAGE in response to transmitting the first MCPC connect message,
transmit, to the first UE, a second MCPC connect message including the MIKEY-SAKKE I_MESSAGE,
receive, from the first UE, a second MCPC acknowledgement message including a reason code field containing a reason for rejecting the MCPTT call, and
transmit, to the second UE, a first MCPC disconnect message including the reason code field,
wherein the reason code field includes a reason code field identity, a reason code length, and a reason code value, and
wherein the reason code value is one of a plurality of predetermined values, and the plurality of predetermined values comprise at least one of:
- a first value indicating "authentication of the MIKEY-SAKKE I_MESSAGE failed,"
- a second value indicating "integrity protection check failed," or
- a third value indicating "unable to decrypt XML content".

13. The server of claim 12, wherein the initiation request is a session initiation protocol (SIP) REFER request.

* * * * *